(12) United States Patent
MacDonald et al.

(10) Patent No.: US 7,903,977 B2
(45) Date of Patent: Mar. 8, 2011

(54) METHOD FOR POLARIZATION-BASED INTRUSION MONITORING IN FIBEROPTIC LINKS

(75) Inventors: Gregory G. MacDonald, Owasso, OK (US); James J. Sluss, Jr., Broken Arrow, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 408 days.

(21) Appl. No.: 11/244,665

(22) Filed: Oct. 6, 2005

(65) Prior Publication Data

US 2006/0072922 A1 Apr. 6, 2006

Related U.S. Application Data

(60) Provisional application No. 60/616,328, filed on Oct. 6, 2004.

(51) Int. Cl.
*H04B 10/00* (2006.01)
(52) U.S. Cl. .............................. 398/152; 398/40; 398/25
(58) Field of Classification Search .................... 398/40, 398/151, 152; 380/256
See application file for complete search history.

(56) References Cited

U.S. PATENT DOCUMENTS

| | | | | |
|---|---|---|---|---|
| 5,026,141 A * | 6/1991 | Griffiths | ........................... | 385/13 |
| 5,061,847 A * | 10/1991 | Hazan et al. | .............. | 250/227.17 |
| 5,202,746 A * | 4/1993 | Sentsui et al. | ................ | 356/73.1 |
| 5,307,410 A * | 4/1994 | Bennett | ........................... | 380/256 |
| 5,349,458 A * | 9/1994 | Karlsson | ......................... | 398/13 |
| 5,384,635 A * | 1/1995 | Cohen et al. | .................. | 356/73.1 |
| 6,650,798 B2 * | 11/2003 | Russell et al. | .................. | 385/11 |
| 7,173,690 B2 * | 2/2007 | Haran | ........................... | 356/73.1 |
| 7,187,860 B2 * | 3/2007 | Bergano et al. | .................... | 398/9 |
| 7,283,688 B2 * | 10/2007 | Frigo et al. | ......................... | 385/1 |
| 7,333,611 B1 * | 2/2008 | Yuen et al. | .................... | 380/256 |

OTHER PUBLICATIONS

Sergio Benedetto, 'Polarization Recovery in Optical Polarization Shift-Keying Systems', IEEE Transactions on Communications, vol. 45, No. 10, Oct. 1997.*

R. Calvani et al., 'Polarisation phase-shift keying: a coherent transmission technique with differential heterodyne detection', Electronics Leters, May 12, 1998, vol. 24, No. 10.*

"Evolution of Polarization Along a Single-Mode Fiber", A. Simon and R. Ulrich, Applied Physics Letters, vol. 31, No. 8, Oct. 15, 1977, pp. 517-520.

(Continued)

*Primary Examiner* — Agustin Bello
(74) *Attorney, Agent, or Firm* — Dunlap Codding, P.C.

(57) ABSTRACT

A fiber optic communication system including a fiber optic link, a transmitter system and a receiver system. The transmitter system includes a laser source producing a light beam, and a polarization controller receiving the light beam and providing an expected pattern of changing states of polarization to the light beam to output light signals into the fiber optic link to cause the expected pattern of changing states of polarization to be transmitted along the fiber optic link. The receiver system is provided with a polarization analyzer, and a light detector. The light detector receives the light signals transmitted by the transmitter, and forwards data indicative of the light signals to the polarization analyzer. The polarization analyzer analyzing the data with an inverse polarization reference frame and generates an alert based on deviations of the data from the expected pattern of changing states of polarization.

8 Claims, 6 Drawing Sheets

OTHER PUBLICATIONS

"Polarization Fluctuation Measurements on Installed Single-Mode Optical Fiber Cables", Grant Nicholson, Member, IEEE, and Douglas J. Temple, Journal of Lightwave Technology, vol. 7, No. 8, Aug. 1989, pp. 1197-1200.

"Multilevel Coherent Optical System Based on Stokes Parameters Modulation"; Silvello Betti, Franco Curti, Giancarlo De Marchis, Member, IEEE, and Eugenio Iannone; Journal of Lightwave Technology, vol. 8, No. 7, Jul. 1990, pp. 1127-1136.

"Trellis Coded Polarization Shift Keying Modulation for Digital Optical Communications"; S. Benedetto, Senior Member, IEEE, G. Olmo, and P. Poggiolini, Member, IEEE; IEEE Transactions on Communications, vol. 43, No. 2/3/4, Feb./Mar./Apr. 1995; pp. 1591-1602.

"Theory of Polarization Shift Keying Modulation"; Sergio Benedetto, Senior Member, IEEE, and Pierluigi Poggiolini; IEEE Transactions on Communications, vol. 40, No. 4., Apr. 1992, pp. 708-721.

"Polarization Recovery in Optical Polarization Shift-Keying Systems"; Sergio Benedetto, IEEE, Roberto Gaudino, and Pierluigi Poggiolini, Member, IEEE; IEEE Transactions on Communications, vol. 45, No. 10, Oct. 1997; pp. 1269-1279.

* cited by examiner $$J_1 = \begin{pmatrix} 0.892 - 0.452i & -0.285 - 0.310i \\ 0.104 - 0.408i & 1.0 + 0.0i \end{pmatrix}$$

$$J_2 = \begin{pmatrix} 0.893 - 0.452i & -0.287 - 0.310i \\ 0.102 - 0.409i & 1.0 + 0.0i \end{pmatrix}$$

$$J_3 = \begin{pmatrix} 0.894 - 0.450i & -0.286 - 0.313i \\ 0.102 - 0.411i & 1.0 + 0.0i \end{pmatrix}$$

METHOD FOR POLARIZATION-BASED INTRUSION MONITORING IN FIBEROPTIC LINKS

CROSS-REFERENCE TO RELATED APPLICATIONS

The present patent application claims priority to the provisional patent application identified by U.S. Ser. No. 60/616,328 which was filed on Oct. 6, 2004. The entire content of the provisional patent application identified by U.S. Ser. No. 60/616,328 is hereby incorporated herein by reference.

STATEMENT REGARDING FEDERALLY SPONSORED RESEARCH OR DEVELOPMENT

Not Applicable.

BACKGROUND OF THE INVENTION

Optical communications is a fast advancing technology. As the transmission of information using fiberoptic cables increases, security risks become of growing concern, especially if military or other highly sensitive information is being transmitted. One prior art method of security for optical communications includes manual surveillance. Another prior art method includes installing fiberoptic cables in pressurized pipes, and then generating an alert whenever pressure monitors detect a variation in the pressure beyond some threshold (i.e., whenever a pipe is disturbed). These methods can be inaccurate and generally require added human resources and/or equipment in addition to that needed for installation and operation of the optical network.

Information can be encoded for transmission using amplitude, frequency, and polarization of a lightwave. While the first two have been used for decades, the use of polarization to encode information is relatively recent. Polarization in optical networks has been used for multiplexing, modulation (polarization shift-keying), cryptographic key generation, and as a data encryption tool.

The present invention reduces such external needs and provides a more efficient and effective method of providing enhanced security for fiberoptic communication links and networks by exploiting the inherent physical properties of fiberoptic cables to detect physical "disturbances" in an optical network. More particularly, the present invention relates to using state of polarization information and the birefringence properties of fiber optics to detect and monitor for physical intrusions of fiberoptic based networks.

SUMMARY OF THE PRESENT INVENTION

The present invention relates to a method for polarization-based intrusion monitoring in a fiber optic link. In general, the method of the present invention utilizes polarization information in a signal transmitted along a fiber optic link to enhance the physical security of optical networks. In one embodiment, an expected pattern of changing states of polarization (SOPs) are generated and transmitted along the fiber optic link, for example by using polarization-shift keying (POLSK). A deviation from the expected pattern at the receiver system is interpreted as an indication of a physical "disturbance" of the fiber.

In order to detect deviations from the expected pattern of SOPs, the method of the present invention exploits the effects caused by fiber birefringence. Birefringence is a term used to describe the effects of refractive index asymmetry in optical fibers. This asymmetry causes two orthogonal states of polarization to propagate at different velocities through the fiber. The two primary causes of fiber birefringence are fiber geometry and stress. There is also a slow time-varying birefringence component that is considered to be random and unpredictable. The end result is that the original state of polarization at launch is transformed as it propagates through the fiber.

A polarization reference frame can be established to model the expected polarization transformation function of the fiber, which is indicative of the effect on the state of polarization due to birefringence caused by the geometry of the fiber, any current stresses on the fiber, and the current effect of the time-varying birefringence component. Once the polarization reference frame is established, known SOPs can be launched and then measured at the receiver system. The inverse of the polarization reference frame can be applied to the measured SOPs received so as to derive calculated-launched SOPs. If the calculated-launched SOPs are different from the known-launched SOPs, i.e. if there are deviations from the expected pattern of SOPs, then the deviations can be assumed to be attributable to new stresses or "disturbances" on the fiber. Thus, deviations from the expected pattern of SOPs can be used to trigger the generation of an alert of a possible "physical intrusion" or tampering of the optical network so as to offer enhanced security for the optical network.

However, to more accurately identify deviations as being caused by physical disturbances, the slow time-varying birefringence component should also be compensated for. In the present invention, the slow time-varying birefringence component is compensated for by utilizing subsequently launched known SOPs to determine a new polarization reference frame, thereby recalibrating the polarization reference frame to account for changes in the expected polarization transformation function of the fiber due to the changed slow time-varying birefringence component. Also, recalibrating the polarization reference frame allows the system to adjust for new stresses on the fiber that will not be immediately removed, such as for example when a new stress is caused by the network owner or is not considered a security threat. Then the system can continue transmitting data, and monitor for subsequent new stresses on the fiber.

To detect possible physical disturbances and to compensate for deviations caused by the relatively slow ("undisturbed") time-varying nature of the birefringent properties of the fiber, one preferred embodiment of the present invention uses a "byte/symbol-stuffing" protocol to embed calibration symbols in a stream of changing SOPs. An example of a method for polarization-based intrusion monitoring in fiberoptic links which uses the "byte/symbol-stuffing protocol" is as follows.

First, a polarization reference frame for the fiberoptic link is established. As discussed above, the polarization reference frame is the expected polarization transformation function associated with the fiberoptic link, and generally depends on the birefringence properties of the fiberoptic link caused by the geometry of the fiberoptic link, any current stresses on the fiber optic link, and the current effect of the time-varying birefringence component. Determining the polarization reference frame allows the effects of the fiber birefringence to be removed at the receiver system.

The polarization reference frame can be established by transmitting three known states of polarization (SOPs) along the fiberoptic link, and then measuring each received SOP. The three known launched SOPs and the three measured SOPs are then used to model the expected polarization transformation, such as for example by determining a Jones matrix (for highly polarized light) or a Mueller matrix (for partially polarized light). Although the present invention has been described above as utilizing three known launched SOPs to determine the polarization reference frame, it should be understood that other numbers of known SOPs may be used in accordance with the present invention, and will generally depend on the method used to model the polarization transformation.

Once the polarization reference frame is established, known SOPs are subsequently launched in an expanded data stream in the form of three calibration symbols or "stuffed byte/symbols" indicative of three known SOPs. In one embodiment, at least one of the "stuffed bytes" is represented by a symbol that is different than any symbols previously defined to represent general data in the expanded data stream. Again, it should be understood that while the present invention is described as using three calibration symbols, a different number of calibration symbols can be used in accordance with the present invention.

Polarization shift keying modulation is preferably used to generate and transmit the expanded data stream. However, it should be understood that other polarization data transfer techniques can be used in accordance with the present invention.

When the data stream is received at the receiver system, the SOPs corresponding to the transmitted calibration symbols are measured. Calculated-launched SOPs are derived from the measured-received SOPs by using the inverse of the polarization reference frame to essentially remove the expected birefringence effects of the fiberoptic link. The calculated-launched SOPs are then compared to the known-launched SOPs to determine whether deviations from the expected pattern of SOPs exist. If deviations exist, an alert is generated indicating a possible physical intrusion of the fiberoptic link.

Further, the polarization reference frame is recalibrated. The calibration symbols of the transmitted expanded data stream (i.e., the three known-launched SOPs and the three measured-received SOPs) are utilized to determine a new or "revised" polarization reference frame in the manner describe above. The new polarization reference frame can then be used when the above described steps are repeated for a subsequently transmitted expanded data stream. As discussed above, by continually or periodically revising or "updating" the polarization transformation function of the fiberoptic link, the slow time-varying birefringence component is tracked and better compensated for. Also, the step of recalibrating the polarization reference frame allows adaptation for desired or tolerated environmental changes in the fiberoptic link so as to provide for continuing transmission of data and monitoring.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIGS. 3(d-f) illustrates various states of right handed elliptically polarized light and their corresponding Stokes parameters.

DETAILED DESCRIPTION OF THE INVENTION

Figure 1:
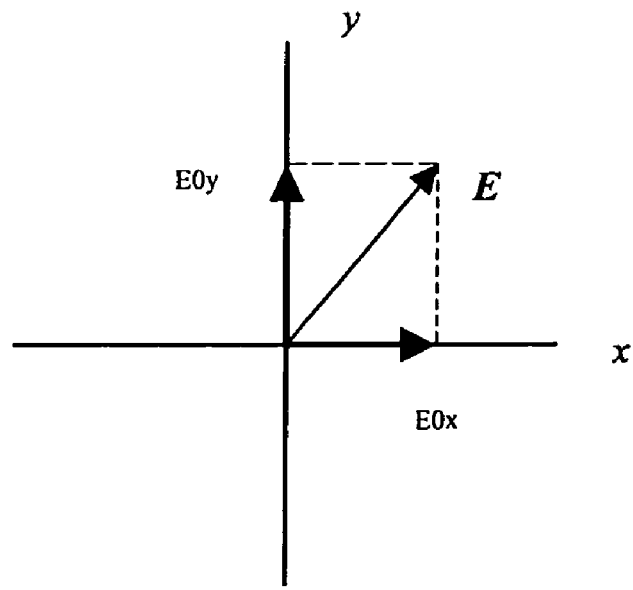
FIG. 1 illustrates an electric field vector E as the sum of two orthogonal components $E_{Ox}$ and $E_{Oy}$ on a pair of Cartesian coordinates X and Y.

Presently preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness.

I. Introduction

Figure 7A:
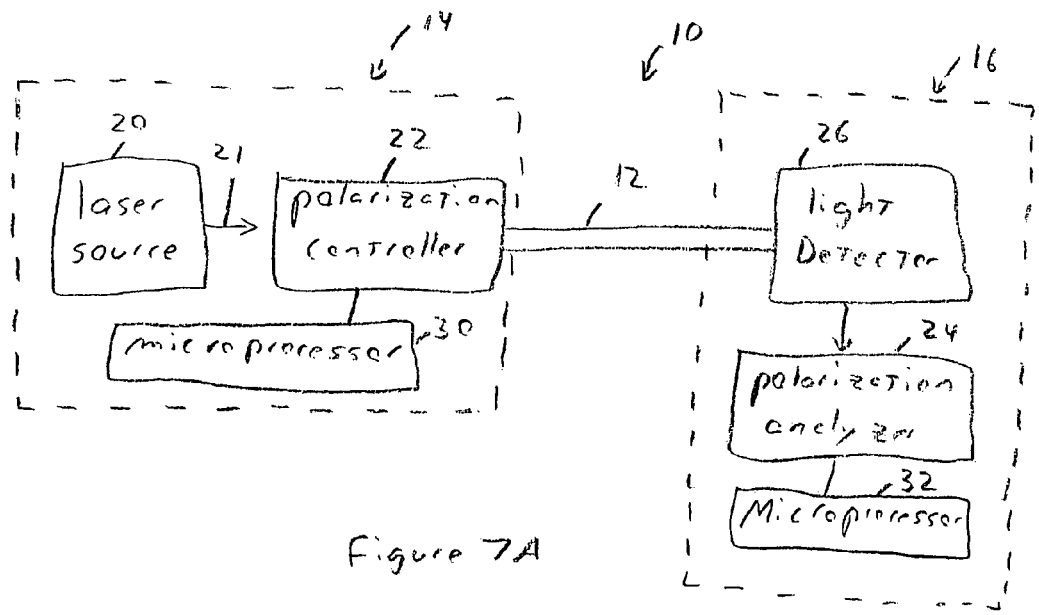
FIG. 7A is a block diagram of a fiber optic communication system constructed in accordance with the present invention.

Referring now to the drawings and in particular to FIG. 7A, a fiber optic communication system 10 constructed in accordance with the present invention is shown. The fiber optic communication system 10 uses the polarization of the light signal to enhance the physical security of one or more fiber optic link 12 in optical network(s). In a preferred embodiment, a polarization-shift keying (POLSK) scheme is used to generate an expected pattern of changing states of polarization (SOPs). A deviation from the expected pattern at the receiver system is due either to some physical "disturbance" of the fiber, or the relatively slow ("undisturbed") time-varying nature of the birefringent properties of the fiber optic link. This last component is addressed using a "byte/symbol-stuffing" protocol that embeds calibration symbols in the stream of changing SOPs.

The technique described is applicable to any point-to-point link where SOP fluctuations due to fiber birefringence can be described by a rigid rotation of the launched SOP (i.e., rigid rotation of the signal constellation points on the Poincare sphere).

The fiber optic communication system 10 is also provided with a transmitter system 14, and a receiver system 16. The transmitter system 14 includes a laser source 20 producing a light beam 21, and a polarization controller 22 receiving the light beam 21 and providing an expected pattern of changing states of polarization to the light beam 21 to output light signals into the fiber optic link 12 to cause the expected pattern of changing states of polarization to be transmitted along the fiber optic link 12. The receiver system 16 is provided with a polarization analyzer 24, and a light detector 26. The light detector 26 receives the light signals transmitted by the laser source 20, and forwards data indicative of the light signals to the polarization analyzer 24. The polarization analyzer 24 analyzes the data with an inverse polarization reference frame and generates an alert based on deviations of the data from the expected pattern of changing states of polarization.

In a preferred embodiment, an initial calibration sequence is required to establish the polarization reference frame. Then the predetermined pattern begins and repeats. The predetermined pattern includes "special" symbols that are "recognized" as re-calibration symbols. In a sense, the special symbols are part of the predetermined pattern in that if some disturbance occurs, the expected special symbol that is to be used for recalibration will not be received. In this case, what is received is still unexpected and alert is raised.

In a commercial application, the polarization controller 22 would be incorporated into the transmitter system 14 and desirably controlled by a local microprocessor 30, even though a remote microprocessor could be used. The polarization analyzer 24 would be incorporated into the receiver system 16 and would also desirably operate under the control of a local microprocessor 32, which is separate from the microprocessor controlling the polarization controller 22.

An example of a suitable polarization controller is a model HP 8160A obtainable from Hewlett Packard Co. In this type of polarization controller, the light beam is 'conditioned' to create linearly polarized light, then it passes through two optical lens to produce a particular state of polarization. The desired polarized state is produced by rotating the two optical lens relative to each other. The optical components are also known as "retarders", e.g., quarter wavelength "retarders" and half wavelength "retarders."

The patent application is organized as follows. Section II is a brief review of the theoretical foundation for this work. This section contains a brief review of polarization theory and a description of polarization in terms of the Stokes parameters and the Poincare sphere. Section III discusses two methods commonly used to model the transformation of the SOP as the lightwave propagates through single mode fiber (Jones Calculus and Mueller Calculus). Section IV describes the 256-POLSK technique and the design of the signal constellation pattern used for this work. Section V describes the proposed "byte/symbol-stuffing" protocol for polarization tracking and explains how it facilitates the removal of the slow time-varying birefringent component. Section VI discusses results for "undisturbed" fiber optic link 12 and "disturbed" fiber optic link 12. Section VII concludes with a discussion regarding the practical application of this technique.

II. Theoretical Foundation

Electromagnetic radiation consists of oscillating electric and magnetic fields. The electric field E and magnetic field H vectors are mutually perpendicular and are both orthogonal to the direction of propagation S (also called the Poynting vector). In polarization, only the direction of the electric field vector E is typically discussed.

Borrowing from Fowles [FOW75]: assuming cartesian coordinates, and the direction of propagation S is along the positive z-axis (towards the reader), the electric field E vector (for a quasi-monochromatic source) can be described as the sum of two orthogonal components (FIG. 1):

$$E_0 = iE_{0x} + ijE_{0y}$$

The corresponding wave function is:

$$E = E_0 \exp i(kz - wt)$$

where, k is the propagation constant, z is the distance in the direction of propagation, and w is the angular frequency.

If $E_0$ is real, the electric field E vector represents linearly polarized light. If $E_0$ is complex the electric field E vector represents elliptically polarized light. If the real and imaginary parts of $E_0$ are equal the electric field E vector represents circularly polarized light. The relative amplitudes and phases of the two orthogonal components determine the direction and path traced out by the tip of the electric field E over time (i.e., the resulting state of polarization). If the direction of rotation is clockwise, the polarization state is said to be right-handed. If the direction of rotation is counterclockwise, the polarization state is said to be left-handed.

Figure 2:
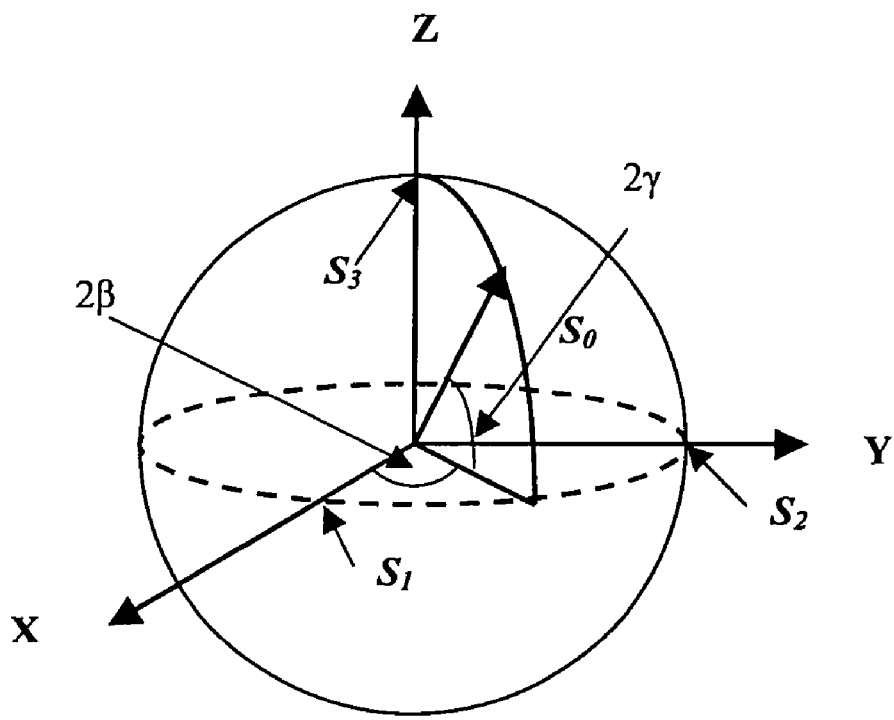
FIG. 2 illustrates four stokes parameters mapped onto a Poincare Sphere.

Although the above description of polarization is in terms of the electric field of the lightwave, it is generally not convenient to measure polarization in such a manner. Fortunately, it is possible to measure the optical power of the lightwave and derive its state of polarization. One common method of expressing the state of polarization is in terms of the Stokes parameters. Stokes parameters are determined by a set of intensity measurements taken when light is passed through various types of polarizers. Stokes parameters are often mapped onto the Poincare sphere (FIG. 2). Combined, the Stokes parameters offer a way to conveniently represent any state of polarization.

The value of each parameter is based on measured intensity levels. The four Stokes parameters are defined as [GRE93]:

$$S_0 = \text{total power(polarized+unpolarized)}$$

$$S_1 = S_0 * \cos(2\gamma) * \cos(2\beta) \quad \text{(eq.1)}$$

$$S_2 = S_0 * \cos(2\gamma) * \sin(2\beta) \quad \text{(eq.2)}$$

$$S_3 = S_0 * \sin(2\gamma) \quad \text{(eq.3)}$$

The physical interpretation of the above is as follows:
  $S_0$=Total power of the received signal (polarized+unpolarized)
  $S_1$=Power received through a horizontal linear polarizer– Power received through a vertical linear polarizer
  $S_2$=Power received through a 45 degree linear polarizer– Power receive through a –45 degree linear polarizer
  $S_3$=Power received through right hand circular polarizer– Power received through a left hand circular polarizer The "normalized" Stokes parameters are given by:

$$s1 = S_1/S_0$$

$$s2 = S_2/S_0$$

$$s3 = S_3/S_0$$

where for fully polarized light, $$S_0 = \{(S_1)^2 + (S_2)^2 + (S_3)^2\}^{1/2}$$

Figure 3:
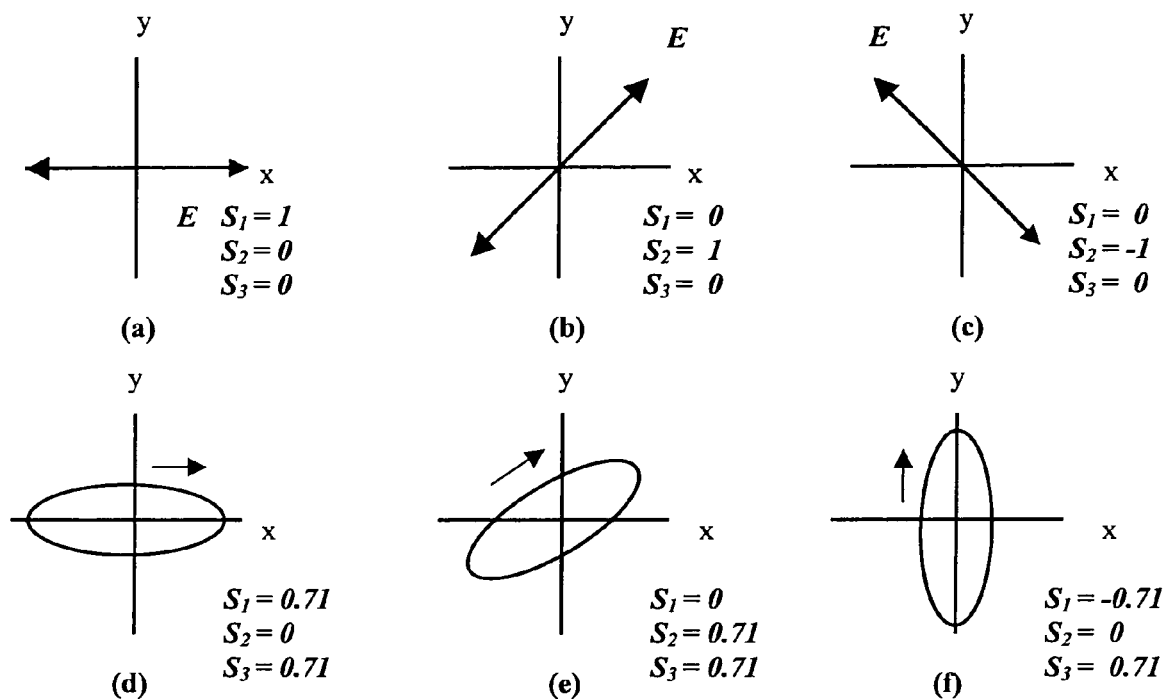
FIGS. 3(a-c) illustrate various states of linearly polarized light and their corresponding Stokes parameters.

Each point on the sphere represents a particular SOP. The region of the sphere where $S_3=0$ ("equator") describes various orientations of linearly polarized light (see FIGS. 3a, 3b, and 3c). Areas where $S_3>0$ ("northern hemisphere") represent right handed elliptically polarized light (see FIGS. 3d, 3e, and 3f), while areas where $S_3<0$ ("southern hemisphere") represent left handed elliptically polarized light.

The eccentricity of the ellipse depends on its "latitude" while the orientation of the ellipse depends on the "longitude". As we move from the "equator" to the "poles" the polarization ellipticity decreases from 1 to 0. The upper most point on the sphere ("north pole") represents right handed circularly polarized light, and the lower most point on the sphere ("south pole") represents left handed circularly polar-

III. Fiber Birefringence and the Polarization Transfer Function

Birefringence is a term used to describe the effects of refractive index asymmetry in optical fibers. This asymmetry causes two orthogonal states of polarization to propagate at different velocities through the fiber optic link 12. The two primary causes of fiber birefringence are the geometry and stress of the fiber optic link 12. There is also a slow time-varying birefringence component that is considered to be random and unpredictable. The end result is that the original state of polarization at launch is transformed as it propagates through the fiber optic link 12.

From previous work the following is known:

If two mutually orthogonal light signals are launched into a fiber, they emerge at the receiver with their orthogonality preserved [CIM87].

The time-varying nature of the state of polarization at the receiver ranges from seconds (during installation) to hours (for already installed fiber) [HAR82].

Evolution of the SOP along single mode fiber can be described as a rigid rotation of points (SOPs) on the Poincare sphere (i.e., described by the Jones Calculus for fully polarized light, or the Mueller Calculus for partially polarized light) [SIM77].

The Jones Calculus yields a 2×2 matrix that describes the polarization transformation function in terms of amplitudes and phases. In general, the elements of the Jones matrix are complex. The Mueller Calculus yields a 4×4 matrix that describes the polarization transfer function in terms of intensity measurements. The elements of the Mueller matrix are real. It should be noted that the Mueller matrix can be derived from the Jones matrix. The relationship is a function of the elements of the Jones matrix and their complex conjugates [GER94]. Since the data in the appendices (B and C) show we are working with "fully" polarized light (DOP column), we will discuss only the Jones Calculus in detail.

The Jones method depends on optical field measurements as opposed to signal intensity measurements. Fully polarized light can be described by a two-element complex vector (sometimes called the Jones Vector) of the form:

$$E = \begin{pmatrix} E_X \\ E_Y \end{pmatrix}$$

For example, the Jones vector for linearly polarized light is:

$$E = \begin{pmatrix} 1 \\ 0 \end{pmatrix}$$

while the Jones vector for right-handed circularly polarized light is:

$$E = \frac{1}{SQRT(2)} \begin{pmatrix} 1 \\ +i \end{pmatrix}$$

Figure 4:
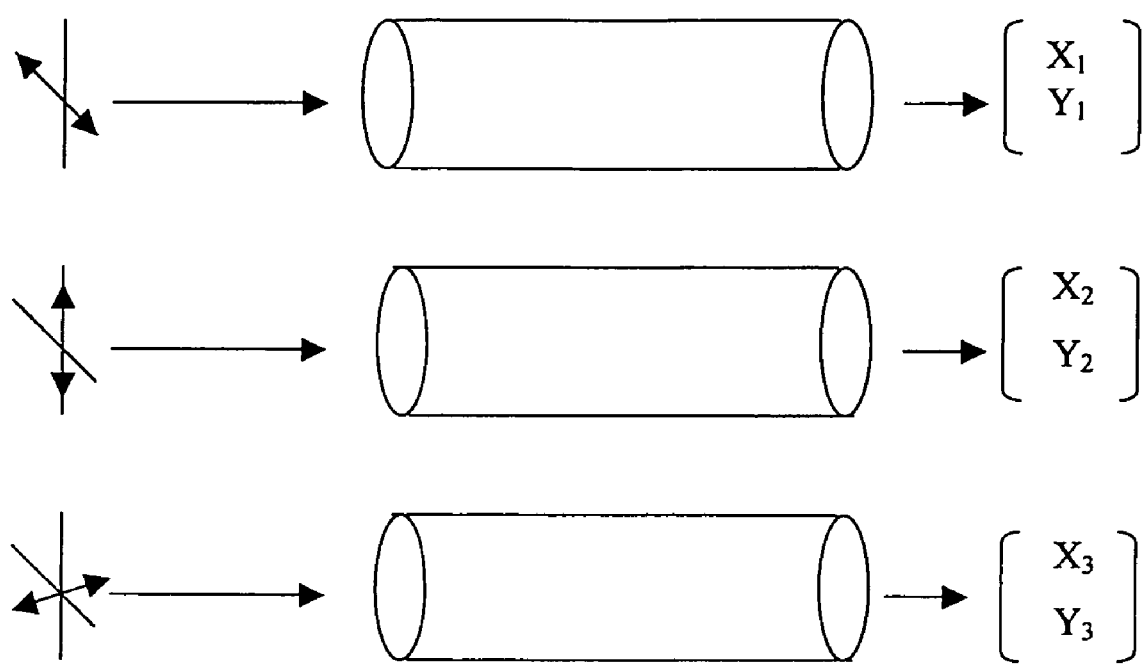
FIG. 4 shows how a Jones matrix J is determined for a device under test. More specifically, three knows polarization states (Jones vectors) are produced at the transmitter and then measured at the receiver system.

The Jones matrix for any device can be determined by measuring the resulting output Jones vectors for three known input Jones vectors [DER98]. While any three distinct input Jones vectors can be used, in practice it is common to use three linear SOPs as shown in FIG. 4.

The relationship between the launch SOP(l) and the received SOP(r) then is:

$$E(r) = J * E(l)$$

where J is the 2×2 Jones matrix. The launched SOP(l) can be recovered from the received SOP(r) by:

$$E(l) = J^{-1} * E(r) \qquad \text{(eq.4)}$$

IV. 256-Polarization Shift-Keying

A number of authors have studied polarization shift keying modulation techniques [BET90][BEN95][BEN97]. The general theory of polarization shift-keying (2-POLSK, 4-POLSK, and 8-POLSK systems) is given by Benedetto [BEN92]. This section describes a simple 256-POLSK technique that involves dividing the Poincare sphere into a number of functional zones.

Figure 5:
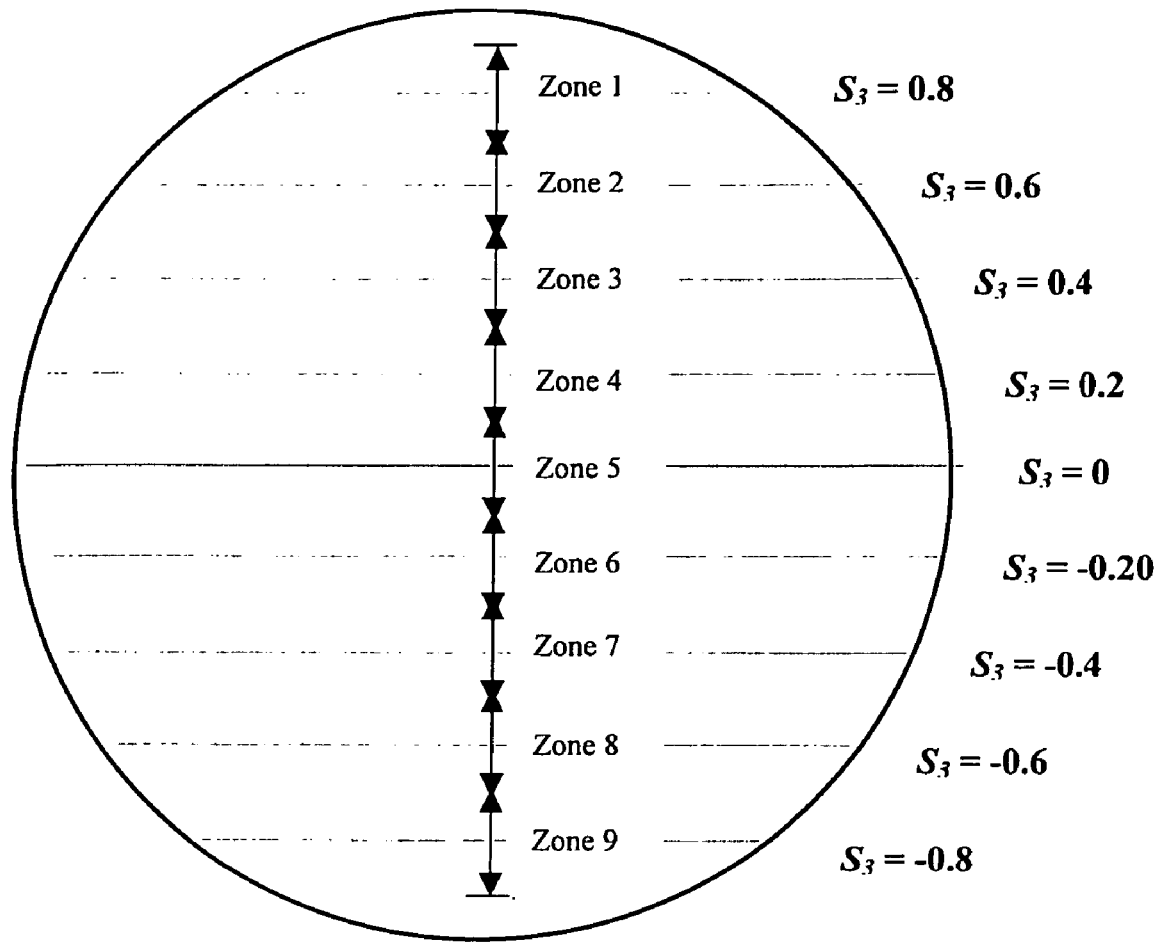
FIG. 5 illustrates a technique that involves dividing the Poincare Sphere into a number of functional zones.
Figure 6:
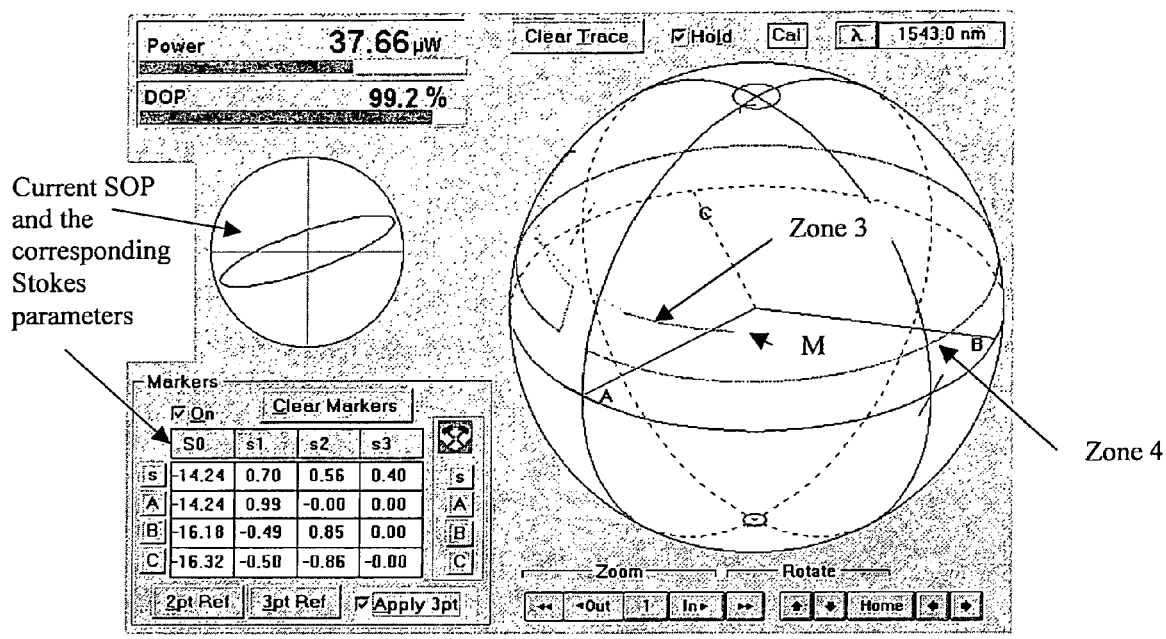
FIG. 6 is a screen shot of a computer illustrating a current state of polarization along with the corresponding Stokes parameters for point M.

The Poincare sphere is divided into a number of functional zones, e.g., 256 areas consisting of eight operational zones and one calibration zone (see table 1, and FIGS. 5 and 6). The purpose is to produce 256 different states of polarization, each SOP representing 1 of the 256 different bit combinations (hexadecimal 00 through FF). Each operational zone is divided into a particular number of segments based on the circumference of the zone center. For example, zone 1 is "centered" at $S_3 = 0.8$ and zone 2 is centered at $S_3 = 0.6$. Since the radius of zone 2 is greater than the radius of zone 1, zone 2 will be divided into a greater number of areas representing a larger number of polarized states (see appendix A for the division for zone 4). Therefore, zones having greater radii have greater resolvable symbol capacity.

TABLE 1

| Zone Number | Zone Function | $S_3$ Range | Polarized States | Hex Byte Value | Zone Number | Zone Function | $S_3$ Range | Polarized States | Hex Byte Value |
|---|---|---|---|---|---|---|---|---|---|
| 1 | operational | $0.7 < S_3 < 0.9$ | 23 | 69–7F | 1 | operational | $0.7 < S_3 < 0.9$ | 23 | 69–7F |
| 2 | operational | $0.5 < S_3 < 0.7$ | 31 | 4A–68 | 2 | operational | $0.5 < S_3 < 0.7$ | 31 | 4A–68 |
| 3 | operational | $0.3 < S_3 < 0.5$ | 35 | 27–49 | 3 | operational | $0.3 < S_3 < 0.5$ | 35 | 27–49 |
| 4 | operational | $0.1 < S_3 < 0.3$ | 38 | 01–26 | 4 | operational | $0.1 < S_3 < 0.3$ | 38 | 01–26 |
| 5 | calibration | $-0.1 < S_3 < +0.1$ | 2 | 00 and 80 | 5 | calibration | $-0.1 < S_3 < +0.1$ | 2 | 00 and 80 |
| 6 | operational | $-0.3 < S_3 < -0.1$ | 38 | 81–A6 | 6 | operational | $-0.3 < S_3 < -0.1$ | 38 | 81–A6 |
| 7 | operational | $-0.5 < S_3 < -0.3$ | 35 | A7–C9 | 7 | operational | $-0.5 < S_3 < -0.3$ | 35 | A7–C9 |
| 8 | operational | $-0.7 < S_3 < -0.5$ | 31 | CA–EA | 8 | operational | $-0.7 < S_3 < -0.5$ | 31 | CA–EA |
| 9 | operational | $-0.9 < S_3 < -0.7$ | 23 | E8–FF | 9 | operational | $-0.9 < S_3 < -0.7$ | 23 | E8–FF |

Operational Zones and Their Corresponding Symbol Range

Figures 7B, 8:
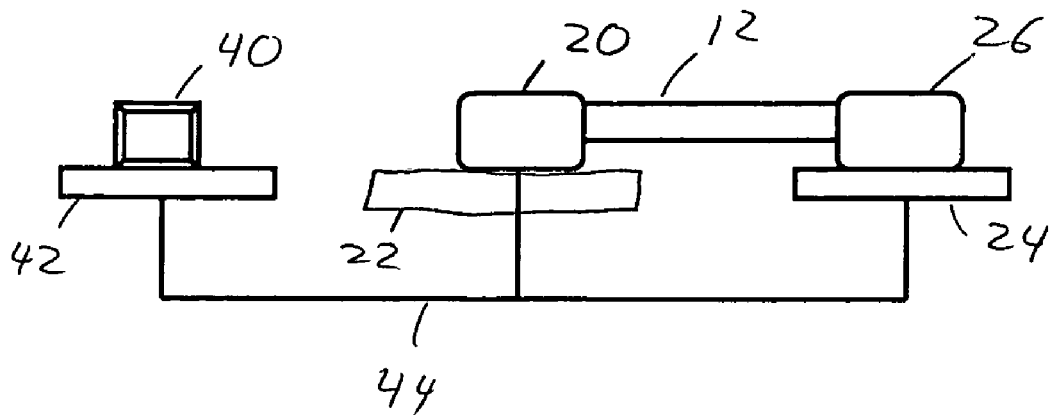
FIG. 7B is another block diagram of the fiber optic communication system.
FIG. 8 illustrates three matrices obtained during three successive calibration sequences for a stationary fiber optic link.

In one example of the present invention depicted in FIG. 7B, the polarization controller 22 and the polarization analyzer 24 are controlled by a personal computer 40. The desired states of polarization and resulting measurements were achieved using the setup shown in FIG. 7B. The personal computer 40 contains a GPIB card 42 and connects to the polarization analyzer 24 and the polarization controller 22 by way of a GPIB bus 44. The fiber optic link 12 was formed by three meters of single mode fiber. In this exemplary embodiment, the controlling entity is a C program (Illustrated in Appendix D of Exhibit A of the provisional patent application identified by U.S. Ser. No. 60/616,328) running on the personal computer 40. The program issues commands to the devices across the GPIB bus 44 and uses the same bus 44 to retrieve data measured by the polarization analyzer 24. Devices are controlled using vendor supplied device drivers and a library of C subroutines.

The C program begins by establishing a polarization reference frame (i.e., measuring the Jones matrix), so the effects of the fiber birefringence (polarization transfer function) can be determined and later removed during the measurement process. This procedure sends instructions to the polarization controller 22 to produce three known states of polarization. The program then instructs the polarization analyzer 24 to measure each received SOP. These three measurements are sufficient to acquire the Jones matrix for the device under test (i.e., the single mode fiber). Once these measurements are complete, subsequently launched SOPs can be derived from the received SOPs using the relationship defined in eq.4. (Note: the inverse transformation is performed by the analyzer once the polarization reference frame is established).

The program maps 256 positions (signal constellation points), for example, on the Poincare sphere as described above. Each position is described in terms of angles $\beta$ and $\gamma$ (FIG. 2). The appropriate Stokes parameters for each $\beta$ and $\gamma$ are calculated using the equations given in section II (eqs. 1-3). The program instructs the polarization controller 22 to produce a unique SOP for each symbol. It then instructs the polarization analyzer 24 to take 100 measurements, returning only the average values for $S_1$, $S_2$, and $S_3$. A "reverse" lookup is performed by the program in order to recover the received symbol. Mid-points of each interval are used as symbol decision criteria. A subset of results for "undisturbed" fiber optic link 12 for zone 4 is given in Appendix B of the Provisional Patent Application identified by U.S. Ser. No. 60/616,328.

V. A Protocol for Polarization Tracking

Algorithms for tracking and recovering the random drift of signal constellation points on the Poincare sphere due to fiber birefringence have been proposed and studied [BEN97]. The following description provides a protocol designed to track and compensate for the slow time-varying nature of the changing SOP. We take advantage of the fact that this slow rate of SOP fluctuation is much slower than the bit-rate [NIC89].

We define hexadecimal symbol "00" to be represented by Stokes parameters $S_1=1$, $S_2=0$, $S_3=0$; and hexadecimal "80" to be represented by Stokes parameters $S_1=-1$, $S_2=0$, $S_3=0$. These two symbols reside in the calibration zone (FIG. 5). The appearance of these symbols in the SOP stream will be followed by three calibration symbols ("stuffed byte/symbols") having the following Stokes parameters (points A, B, and C in FIG. 6): his figure shows zone 4 and part of zone 3. The red lines are on the front side of the sphere while the blue lines are on the back side of the sphere. The display on the left side of this figure shows the current state of polarization along with the corresponding Stokes parameters for point M. Points A, B, and C are the calibration points (next section).

$S1=1.0$ $S2=0.0$, $S3=0$ (first "stuffed byte")

$S1=-0.500$, $S2=0.866$, $S3=0$ (second "stuffed symbol")

$S1=-0.500$, $S2=-0.866$, $S3=0$ (third "stuffed symbol")

It should be noted the second and third "stuffed bytes" are not any of the 256 previously defined symbols. Instead, they are simply two additional SOPs. All "stuffed" entities represent linear SOPs.

Consider the following raw SOP stream:
1F 20 4D 55 00 3F EF 5F 75 B3 80 EE
This stream would be expanded to include the calibration symbols:

Calibration Sequence      Calibration Sequence 1F 20 4D 55 00 00 SOP2 SOP3 3F EF 5F 75 B3 80 00 SOP2 SOP3 EE $\uparrow J_1$        $\uparrow J_2$ The "stuffed" byte/symbols represent three known states of polarization, making the determination of a new Jones matrix ($J_i$) possible. As explained in Section III, this "revised" Jones matrix describes the evolving polarization transfer function. This essentially removes the slow time-varying birefringence component. Any remaining deviations from the expected SOP are likely to be due to some physical disturbance of the fiber optic link 12. In the C program, if the expected SOP is not recovered, a "physical intrusion" alert is generated and then the system is recalibrated.

VI. Discussion of Experimental Results

Appendices A, B, C and D in Exhibit A of the provisional patent application identified by U.S. Ser. No. 60/616,328 are hereby expressly incorporated herein by reference in their entirety. Appendices A, B, and C contain data relevant to the 256-POLSK technique described above and more specifically describe examples of the invention, the production thereof and uses thereof.

Appendix A shows how zone 4 can be partitioned into 38 different segments. Each segment is defined by a set of Stokes parameters ($S_1$, $S_2$, $S_3$). Each set of Stokes parameters describes a unique state of polarization, and hence a different symbol. The values shown for $S_1$, $S_2$, and $S_3$ represent the "center" values. The angle column represents a point on the Poincare sphere rotated counterclockwise about the $S_3$ axis (as viewed from above the sphere). Appendix A contains the theoretical Stokes parameters required to produce the desired SOPs for operational zone 4. The graphs for other zones will be similar with the exception of a vertical shift in the $S_3$ line and a different number of points for the $S_1$ and $S_2$ parameters (reflecting a different radius for each zone).

Appendix B shows the Stokes parameter values specified to produce different SOPs and the received Stokes parameter measurements. Appendix B represents the fiber optic link 12 that is "undisturbed". The specified and measured values track very closely, reflecting little variation in the evolving Jones matrix. Appendix B shows a table illustrating a subset (zone 4) of the experimentally obtained results. The table in Appendix B shows the symbol to be sent, the required Stokes parameters (state of polarization) to produce the symbol [S(s)], the measured Stokes parameters at the receiver system [S(r)], and the recovered symbol. The data presented in this section is typical for the fiber optic link 12 that is "undisturbed." The "DOP" column is the degree of polarization.

Although not related to the data presented in Appendix B, Jones matrix measurements for the "undisturbed" fiber optic link 12 typically evolve slowly as shown in FIG. 8.

Appendix C shows the received Stokes parameters for the "disturbed" fiber optic link 12 case. In this case, the fiber disturbance at symbol 28 (hex 1C) is clearly evident and results in the recovery of symbol 3D. Since this is not the expected symbol, recalibration is performed resulting in a "revised" Jones matrix. Subsequent data appear to track nicely with the expected SOP sequence only because the revised Jones matrix has been applied. Although not shown, any attempt to place the fiber optic link 12 back into its undisturbed position would result in another unexpected symbol, and a recalibration. Since not all regions of the Poincare sphere contained defined symbols, disturbed fiber optic link 12 may produce Stokes parameters that do not represent a defined SOP. All that is required to generate an alert is the recovery of an unexpected SOP or a set of Stokes parameters that do not represent a defined SOP. The table in Appendix C shows the symbol to be sent, the required Stokes parameters (state of polarization) to produce the symbol [S(s)], the measured Stokes parameters at the receiver system [S(r)], and the recovered symbol. The data presented in this section includes randomly "disturbed" fiber optic link 12 at symbol "1C". Again, "DOP" column is the degree of polarization.

VII. Final Remarks

An existing technique used by the U.S. government to monitor network cables for tampering activities involve installing fiber in pressurized pipes. Alerts are generated whenever pressure monitors detect a variation in the pressure that deviates from some threshold. The assumption here is pressure readings that exceed threshold values are caused by some physical disturbance of the pressurized pipes.

The present invention is directed to an alternate technique that uses polarization and the birefringent properties of a fiber optic link 12, e.g., single mode fiber, to provide enhanced protection for optical networks. A received SOP that differs from the expected SOP is due either to a physical disturbance of the fiber optic link 12, or the slow time-varying nature of the properties of the fiber optic link 12. The latter is tracked using a "byte/symbol stuffing" protocol. A new Jones matrix is determined from these calibration symbols. Recalibration occurs whenever the data stream contains these "special" SOPs and whenever the received SOP differs from the expected SOP. By taking advantage of the fact that the slow time-varying component occurs much slower than the bit-rate, we can compensate for this component. Received SOP's that differ from the expected SOP's are presumed to be caused by a physical disturbance somewhere along the fiber optic link 12. Alerts are issued indicating a potential tampering situation.

It will be understood from the foregoing description that various modifications and changes may be made in the preferred and alternative embodiments of the present invention without departing from its true spirit. For example, if the tracking is so far off that we can no longer recognize the calibration sequence, this becomes an unexpected deviation and the polarization reference frame is recalibrated. Further, although a system using 256 symbols has been described, it is reasonable to use a constellation pattern that having far fewer symbols. In fact, it is possible to conceive of an adaptive technique that varies the number of symbols in use over time. Intuitively, a system using fewer constellation signal points would probably be more tolerant of a wider variation of environmental conditions, while a system using an adaptive approach would be more responsive to changing conditions.

How frequently should the SOP be changed? Although we varied the SOP each bit period, our bit periods were relatively long in time. The speed of the GPIB bus 44 and a firmware problem with the polarization analyzer 24 required us to deliberately introduce elongated bit periods. Another approach might involve maintaining the same SOP over many bit periods. In this instance, the SOP period is independent of the bit period. Rapid SOP measurements may also be possible. A recent study [VAN99] demonstrated the ability to perform SOP measurements at the nanosecond level.

How does an out of order SOP effect the bit error rate? In this technique polarization is essentially used as a separate channel. As such, we do not use the SOP to bear actual data bit information. As long as the receiving equipment is insensitive to fluctuations in polarization, out of order SOPs should not impair data bit flow.

Appendix D contains an exemplary C program used to map the constellation points on the Poincare sphere, control the polarization controller 22, and gather the data from the polarization analyzer 24.

However, although the foregoing invention has been described in some detail by way of illustration and example for purposes of clarity of understanding, it will be apparent to those skilled in the art that certain changes and modifications may be practiced without departing from the spirit and scope thereof, as described herein and in the above-referenced attachments.

REFERENCES

1. The contents of each of the below identified references are hereby incorporated herein by reference in their entirety.
2. Benedetto, S., Poggiolini, P., 1992. Theory of Polarization Shift Keying Modulation. *IEEE Transactions on Communications*. Vol. 40, No. 4. Apr. 4, 1992. [BEN92]
3. Benedetto S., Gaudino, R., Poggiolini, P., 1997. Polarization Recovery in Optical Polarization Shift-Keying Systems. *IEEE Transactions on Communications*. Vol. 45, No. 10, October, 1997. [BEN97]
4. Benedetto S., Olmo R., Poggiolini P., 1995. Trellis Coded Polarization Shift Keying Modulation for Digital Optical Communications. *IEEE Transactions on Communications*. Vol. 43, No. 2, pp. 1591-1602, February 1995. [BEN95]
5. Betti S., Curti, F., De Marchis, G., Iannone E., 1990. Multilevel Coherent Optical System Based on Stokes Parameters Modulation. *Journal of Lightwave Technology*, Vol. 8, No. 7, July 1990. [BET90]
6. Cimini, L. J., Habbab, I. M., John, R. K., Saleh, A. A, 1987. On the Preservation of Polarization Orthogonality a Through Linear System. *Electronic Letters*. Vol. 23, No. 23, pp. 1365-1366, Dec. 3, 1987. [CIM87]
7. Derickson, D., 1998. *Fiber Optic Test and Measurement*. Princeton-Hall, Inc. 1998. [DER98]
8. Fowles, Grant, R., 1975. *Introduction to Modern Optics*. Dover Publications, Inc., 2nd Ed., [FOW75]

9. Gerrard, A., Burch, J. M., 1994. *Introduction to Matrix Methods in Optics*. Dover Publications, Inc. (Originally published in 1975). [GER94]
10. Green, Paul, E., 1993. *Fiber Optic Networks*. Princeton Hall PTR. [GRE93]
11. Harmon, R. A., 1982. Polarization Stability in Long Lengths of Monomode Fiber. *Electronic Letters*. Vol. 18, No. 24, pp. 1058-1060, November 1982. [HAR82]
12. Nicholson, G., Temple, D. J., 1989. Polarization Fluctuation Measurement on Installed Single-Mode Optical Fiber Cables. *Journal of Lightwave Technology*. Vol. 7, August, 1989. [NIC89]
13. Simon, A., Ulrich, R., 1977. Evolution of Polarization along a Single Mode Fibre. *Applied Physics Letters*. Vol. 31, No. 8, pp. 517-520, 1977. [SIM77]
14. Van Wiggeren, G., Roy, R., 1999. High-Speed Fiber-Optic Polarization Analyzer: Measurements of the Polarization Dynamics of an Erbium-doped Fiber Ring Laser. *Optical Communications*. Issue 164, pp. 107-120, 1999. [VAN99]
15. Van Wiggeren, G., Roy, R., 2002. Communication with Dynamically Fluctuating States of Light Polarization. *Physical Review Letters*. Vol 88., No 9. Mar. 4, 2002. [VAN02]

What is claimed is:

1. A fiber optic communication system, comprising:
   a fiber optic link;
   a transmitter system coupled to the fiber optic link, the transmitter system comprising:
      a laser source producing light beams; and
      a polarization controller receiving the light beams and encoding symbols into the light beams to provide an expected pattern of changing states of polarization to the light beams to output light signals into the fiber optic link to cause the light beams having the expected pattern of changing states of polarization to be transmitted along the fiber optic link;
   a receiver system coupled to the fiber optic link, the receiver system comprising:
      a polarization analyzer; and
      a light detector receiving the light signals transmitted by the transmitter, and forwarding data indicative of the light signals to the polarization analyzer, the polarization analyzer analyzing the data with an inverse polarization reference frame to (1) monitor the fiber optic link for a possible physical intrusion/disturbance based on deviations of the data from the symbols encoded into the light beams and (2) generate an alert indicative of a possible physical intrusion of the fiber optic link, wherein the transmitter system and the receiver system are not coupled to the fiber optic link with the same element.

2. The fiber optic communication system of claim 1, wherein the inverse polarization reference frame is periodically recalibrated to account for a slow time-varying birefringence component of the fiber optic link.

3. The fiber optic communication system of claim 1, wherein the polarization controller embeds calibration symbols in the expected pattern of changing states of polarization.

4. The fiber optic communication system of claim 3, wherein the polarization analyzer receives data indicative of the embedded calibration symbols, and uses the embedded calibration symbols to recalibrate the inverse polarization reference frame.

5. A method for polarization-based intrusion monitoring in a fiber optic link, comprising the steps of:
   encoding symbols into light signals to form an expected pattern of changing states of polarization into the light signals;
   transmitting the light signals along the fiber optic link
   receiving the light signals and generating data indicative of the light signals;
   analyzing the data with an inverse polarization reference frame to monitor the fiber optic link for a possible physical intrusion/disturbance based on deviations of the data from symbols encoded into the light signals wherein the steps of transmitting the light signals and receiving the light signals do not use the same element to couple to the fiber optic link; and
   generating an alert indicative of a possible physical intrusion of the fiber optic link.

6. The method of claim 5, further comprising the step of periodically recalibrating the inverse polarization reference frame to account for a slow time-varying birefringence component of the fiber optic link.

7. The method of claim 5, wherein the step of transmitting the light signal further comprising the step of embedding multiple calibration symbols in the expected pattern of changing states of polarization to construct a calibration sequence.

8. The method of claim 7, wherein a polarization analyzer receives data indicative of the embedded calibration symbols, and uses the embedded calibration symbols to recalibrate the inverse polarization reference frame.

* * * * *